Patented Mar. 12, 1935

1,994,328

UNITED STATES PATENT OFFICE 1,994,328

CREAMING OF RUBBER LATEX

Ralph F. Tefft, Nutley, N. J., assignor, by mesne assignments, to United States Rubber Company, New York, N. Y., a corporation of New Jersey No Drawing. Application September 9, 1933, Serial No. 688,825

11 Claims. (Cl. 18—50)

This invention relates to the treatment of rubber latex, and more particularly to the creaming of latex.

Heretofore a number of natural materials, such as vegetable mucilages, gums, glue, alginates, pectin bodies and the like, have been used to cream latex, that is, cause a separation of the rubber latex into two layers, a supernatant purified rubber-rich portion and a subnatant aqueous or serum portion poor in rubber. The rubber-rich layer may be separated from the aqueous portion and, if desired, diluted with water and recreamed to provide a further removal of water soluble non-rubber constituents and a consequent further purification.

It has now been discovered that water-soluble cellulose ethers, such as alkylated cellulose materials, added in small amounts to rubber latex will cause a creaming of the same similarly to creaming agents heretofore available. The mono-alkyl and di-alkyl ethers of cellulose are particularly suitable for this purpose. These alkylated cellulose compounds, for example monomethyl cellulose, monoethyl cellulose, monopropyl cellulose, dimethyl cellulose, diethyl cellulose, dipropyl cellulose, and the like, besides being synthetic products, also differ from prior known creaming agents in that they are most effective as creaming agents at ordinary temperatures, due to their decrease in solubility with rise in temperature.

Without intention to limit the invention except as required by the prior art, the following examples of the creaming of latex with the aid of a typical water-soluble alkylated cellulose, namely dimethyl cellulose, are included.

Various amounts of dimethyl cellulose were added to latex and stirred therein, the latex in each case containing 32% total solids before creaming. Separation of the rubber-rich and serum portions was effected by allowing the mixture to stand for 70 hours at room temperature. The total solids in the serum portions and cream portions were determined, the results being shown in the following table:

| Parts alkylated cellulose per 100 parts latex solids | Concentration of solids in serum (%) | Concentration of solids in cream (%) |
|---|---|---|
| .182 | 15.7 | 53.4 |
| .189 | 12.4 | 56.3 |
| .236 | 10.0 | 58.5 |
| .283 | 8.61 | 59.5 |
| .378 | 6.58 | 59.8 |

For proper creaming with alkylated cellulose up to .5 part of the creaming agent per 100 parts of latex solids may be used. Such amounts of alkylated cellulose are insufficient to effect coagulation on heating of the latex to be creamed or of the creamed product.

A latex similar to the first latex in the above table, namely one containing .182 part of dimethyl cellulose to 100 parts latex solids, was creamed by allowing it to stand for 70 hours at a temperature of 70° C. After this period of time the latex had separated into a serum of 24.5% total solids and a cream of 38.9% total solids. After cooling to room temperature both the serum and the cream from this experiment underwent further creaming on standing. This definite decrease in the creaming properties at elevated temperatures is explained by the fact that this alkylated cellulose is substantially insoluble in hot water, the solubility of the same decreasing as the temperature rises. On cooling, the alkylated cellulose re-dissolved and further creaming of both the cream and serum portions took place.

Latex creamed with the aid of a water-soluble alkylated cellulose may be further purified by repeating the creaming operation any desired number of times, the greater proportion of the remaining water-soluble constituents of the latex appearing each time in the serum portion. In doing this it is only necessary to add water and the desired amounts of the creaming agent. In this way it is possible to obtain a stable latex cream containing practically no water-soluble non-rubber constituents.

Vulcanized latex as well as normal latex may be creamed by the method of this invention if the separation is aided by some method such as the known centrifugal method of aiding the separation of the rubber-rich and serum portions in creaming vulcanized latex, or by the method set forth in McGavack Patent No. 1,921,575, issued August 8, 1933.

The term "latex" in the specification and claims is intended to include vulcanized latex as well as unvulcanized latices.

With the detailed disclosure above given, it is obvious that modifications will suggest themselves and it is not desired to limit the invention otherwise than as set forth in the appended claims.

Having thus described my invention, what I claim and desire to protect by Letters Patent is:

1. As a new product, a rubber latex containing up to .5 part of a water-soluble alkylated cellulose per hundred parts of latex solids.

2. As a new product, a concentrated latex containing up to .5 part of water-soluble alkylated cellulose per 100 parts of latex solids, said concentrated latex containing a sub-normal amount of the non-rubber constituents originally present in said latex.

3. As a new product, a rubber latex containing up to .5 part dimethyl cellulose per 100 parts of latex solids.

4. As a new product, a concentrated latex containing up to .5 part dimethyl cellulose per 100 parts of latex solids, said concentrated latex containing a sub-normal amount of the non-rubber constituents originally present in said latex.

5. A process for treating rubber latex which comprises segregating a rubber-rich portion therefrom by allowing the latex to cream after incorporation therein of a small amount of a water-soluble alkylated cellulose, removing the serum portion therefrom, and recovering an uncoagulated rubber dispersion from said latex.

6. A process for concentrating and purifying latex which comprises segregating a rubber-containing portion therefrom by incorporation in said latex at room temperature a small amount of a water-soluble alkylated cellulose, allowing the mixture to cream at room temperature, removing the serum portion therefrom, and recovering an uncoagulated rubber dispersion from said latex.

7. A process for concentrating and purifying latex which comprises segregating a rubber containing portion therefrom by incorporating in said latex at room temperature up to .5 part of a water-soluble alkylated cellulose per 100 parts of latex solids, removing the serum portion therefrom, and recovering an uncoagulated rubber dispersion from said latex.

8. The method of treating latex which comprises adding thereto up to .5 part of a water-soluble alkylated cellulose per 100 parts of latex solids to effect a separation thereof into a supernatant rubber-rich layer and a subnatant serum layer poor in rubber and containing water-soluble non-rubber constituents, and recovering the supernatant layer.

9. The method of treating latex which comprises adding to latex a small amount of dimethyl cellulose, allowing the latex to separate into an uncoagulated rubber-rich portion and a serum portion, and separating the said two portions.

10. The method of treating latex which comprises adding thereto up to .5 part of dimethyl cellulose per 100 parts of latex solids, allowing the latex to separate into an uncoagulated rubber-rich portion and a serum portion, and separating the said two portions.

11. A process for concentrating and purifying latex which comprises segregating a rubber containing portion therefrom by incorporating in said latex at room temperature up to .5 part of dimethyl cellulose per 100 parts of latex solids, removing the serum portion therefrom, and recovering an uncoagulated rubber dispersion from said latex.

RALPH F. TEFFT.